United States Patent
Tjew et al.

(10) Patent No.: US 10,193,772 B1
(45) Date of Patent: Jan. 29, 2019

(54) USER BEHAVIOR ANALYZER

(71) Applicant: Electronic Arts Inc., Redwood City, CA (US)

(72) Inventors: Andrew Tjew, Burnaby (CA); Wilson Chan, Burnaby (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 15/383,695

(22) Filed: Dec. 19, 2016

Related U.S. Application Data

(63) Continuation of application No. 13/662,319, filed on Oct. 26, 2012, now Pat. No. 9,529,777.
(Continued)

(51) Int. Cl.
*H04L 12/26* (2006.01)
*H04L 29/06* (2006.01)
(Continued)

(52) U.S. Cl.
CPC ......... *H04L 43/045* (2013.01); *G06N 99/005* (2013.01); *H04L 41/14* (2013.01); *H04L 63/10* (2013.01); *H04L 63/1408* (2013.01); *H04L 63/1425* (2013.01); *H04L 65/1076* (2013.01); *H04L 67/42* (2013.01); *G06F 9/541* (2013.01); *G06F 11/3672* (2013.01)

(58) Field of Classification Search
CPC ...... H04L 67/24; H04L 51/36; H04L 63/1408
See application file for complete search history.

(56) References Cited

U.S. PATENT DOCUMENTS 6,769,016 B2   7/2004   Rothwell et al.
7,877,482 B1   1/2011   Ashcraft et al.
(Continued)

OTHER PUBLICATIONS

Alex Beutel, Wanhong Xu, Venkatesan Guruswami, Christopher Palow, and Christos Faloutsos. "Copycatch: stopping group attacks by spotting lockstep behavior in social networks." In WWW, pp. 119-130. ACM, 2013.
(Continued)

*Primary Examiner* — Barbara B Anyan
(74) *Attorney, Agent, or Firm* — Knobbe, Martens, Olson & Bear, LLP

(57) ABSTRACT

A system and method is shown for identifying abnormal client behavior with respect to communications between one or more servers and one or more client devices communicatively coupled to the one or more servers. Messages are received at a server from one or more client devices communicatively coupled to the server. The plurality of messages are grouped into subsets of messages using a learn module of the server. Each subset of messages is associated with a unique client identifier, and all messages within a subset are associated with the same unique client identifier. Each message within a subset of messages is identified as belonging to a defined type of message. Sequences of the defined types of messages within each of said subsets of messages are recorded using the learn module. Time intervals between the defined types of messages are measured using the learn module. The recorded sequences of defined types of messages and the measured time intervals between the defined types of messages are designated as constituting normal client behavior.

20 Claims, 4 Drawing Sheets

Related U.S. Application Data

(60) Provisional application No. 61/552,825, filed on Oct. 28, 2011.

(51) Int. Cl.
*H04L 12/24* (2006.01)
*G06N 99/00* (2010.01)
*G06F 9/54* (2006.01)
*G06F 11/36* (2006.01)

(56) References Cited

U.S. PATENT DOCUMENTS

| | | |
|---|---|---|
| 7,974,849 B1 | 7/2011 | Begole et al. |
| 8,370,389 B1 | 2/2013 | Dotan |
| 8,589,174 B2 | 11/2013 | Nelson et al. |
| 8,794,508 B1 | 8/2014 | Pascal |
| 8,881,266 B2 | 11/2014 | Chow et al. |
| 9,231,936 B1 | 1/2016 | Wang et al. |
| 9,517,402 B1 | 12/2016 | Vogel |
| 9,529,777 B2 | 12/2016 | Tjew et al. |
| 9,992,018 B1 | 6/2018 | Tjew et al. |
| 2002/0165838 A1 | 11/2002 | Vetter |
| 2004/0039630 A1 | 2/2004 | Begole et al. |
| 2005/0014559 A1 | 1/2005 | Mattice et al. |
| 2005/0108384 A1* | 5/2005 | Lambert ............ H04L 63/1408 709/224 |
| 2006/0036727 A1 | 2/2006 | Kurapati et al. |
| 2006/0093142 A1 | 5/2006 | Schneier et al. |
| 2007/0043851 A1 | 2/2007 | Yellamraju et al. |
| 2007/0111794 A1 | 5/2007 | Hogan et al. |
| 2007/0121596 A1 | 5/2007 | Kurapati et al. |
| 2007/0266394 A1 | 11/2007 | Odent et al. |
| 2008/0059474 A1 | 3/2008 | Lim |
| 2008/0065994 A1* | 3/2008 | Wang .................... G06F 9/541 715/746 |
| 2008/0209544 A1 | 8/2008 | Kempka |
| 2008/0310312 A1* | 12/2008 | Acharya ............ H04L 65/1076 370/241 |
| 2009/0054123 A1 | 2/2009 | Mityagin et al. |
| 2009/0143144 A1 | 6/2009 | Schluessler et al. |
| 2009/0164788 A1 | 6/2009 | Cho et al. |
| 2009/0219895 A1* | 9/2009 | Wu ...................... H04L 1/0041 370/335 |
| 2009/0235226 A1* | 9/2009 | Murthy .................... G06F 8/10 717/104 |
| 2010/0162405 A1 | 6/2010 | Cook et al. |
| 2011/0012603 A1 | 1/2011 | Bose et al. |
| 2011/0167269 A1 | 7/2011 | Baykal et al. |
| 2012/0047578 A1 | 2/2012 | Lee et al. |
| 2012/0137367 A1 | 5/2012 | Dupont et al. |
| 2013/0296039 A1 | 11/2013 | Engineer et al. |
| 2013/0311977 A1* | 11/2013 | Nieminen ........... G06F 11/3672 717/135 |
| 2015/0238866 A1 | 8/2015 | Khabazian |
| 2016/0110528 A1 | 4/2016 | Gupta et al. |
| 2016/0191654 A1 | 6/2016 | Healey et al. |
| 2017/0098067 A1 | 4/2017 | Paluri et al. |

OTHER PUBLICATIONS

"Blizzard Entertainment Uses Spyware to Verify EULA Compliance", Schneier on Security, posted Oct. 13, 2005, retrieved Aug. 14, 2015, http://www.schneier.com/blog/archives/2005/10/blizzard_entert.html, 25 pgs.

Bokai Cao, Francine Chen, Dhiraj Joshi, and Philip S Yu. "Inferring crowd-sourced venues for tweets." IEEE Big Data, pp. 639-648. IEEE, 2015.

Bokai Cao, Xiangnan Kong, and Philip S Yu. "Collective prediction of multiple types of links in heterogeneous information networks." In ICDM, pp. 50-59. IEEE, 2014.

Qiang Cao, Michael Sirivianos, Xiaowei Yang, and Tiago Pregueiro. "Aiding the detection of fake accounts in large scale social online services." In NSDI, pp. 197-210, 2012.

Cao, Qiang, et al. "Aiding the Detection of Fake Accounts in Large Scale Social Online Services", http://www.usenix.org/system/files/conference/nsdi12/nsdi12-final42_2.pdf, accessed Aug. 6, 2015, 14 pgs.

William Eberle and Lawrence Holder. "Discovering structural anomalies in graph-based data." ICDMW, pp. 393-398. IEEE, 2007.

Jing Gao, Feng Liang, Wei Fan, Chi Wang, Yizhou Sun, and Jiawei Han. "On community outliers and their efficient detection in information networks." In KDD, pp. 813-822. ACM, 2010.

Saptarshi Ghosh, Bimal Viswanath, Farshad Kooti, Naveen Kumar Sharma, Gautam Korlam, Fabricio Benevenuto, Niloy Ganguly, and Krishna Phani Gummadi. "Understanding and combating link farming in the twitter social network." In WWW, pp. 61-70. ACM, 2012.

Manish Gupta, Jing Gao, Xifeng Yan, Hasan Cam, and Jiawei Han. "On detecting association-based clique outliers in heterogeneous information networks." In ASONAM, pp. 108-115. IEEE, 2013.

Manish Gupta, Arun Mallya, Subhro Roy, Jason HD Cho, and Jiawei Han. "Local learning for mining outlier subgraphs from network datasets." In SDM. SIAM, 2014.

Zoltán Gyöngyi, Hector Garcia-Molina, and Jan Pedersen. "Combating web spam with trustrank." In VLDB, pp. 576-587. VLDB Endowment, 2004.

Bryan Hooi, Hyun Ah Song, Alex Beutel, Neil Shah, Kijung Shin, and Christos Faloutsos. "Fraudar: Bounding graph fraud in the face of camouage." In KDD. ACM, 2016.

Ming Ji, Jiawei Han, and Marina Danilevsky. "Ranking-based classification of heterogeneous information networks." In KDD, pp. 1298-1306. ACM, 2011.

Meng Jiang, Peng Cui, Alex Beutel, Christos Faloutsos, and Shiqiang Yang. "Catchsync: catching synchronized behavior in large directed graphs." In KDD, pp. 941-950. ACM, 2014.

Nitin Jindal and Bing Liu. "Opinion spam and analysis." In WSDM, pp. 219-230. ACM, 2008.

Xiangnan Kong, Bokai Cao, and Philip S Yu. "Multi-label classification by mining label and instance correlations from heterogeneous information networks." In KDD, pp. 614-622. ACM, 2013.

Xiangnan Kong, Philip S Yu, Ying Ding, and David J Wild. "Meta path-based collective classification in heterogeneous information networks." In CIKM, pp. 1567-1571. ACM, 2012.

Chao Liu, Xifeng Yan, Hwanjo Yu, Jiawei Han, and S Yu Philip. "Mining behavior graphs for "backtrace" of noncrashing bugs." In SDM, pp. 286-297. SIAM, 2005.

Qing Lu and Lise Getoor. "Link-based classification." In ICML, vol. 3, pp. 496-503, 2003.

Emaad Manzoor, Sadegh M Milajerdi, and Leman Akoglu. "Fast memory-efficient anomaly detection in streaming heterogeneous graphs." In KDD. ACM, 2016.

Jennifer Neville and David Jensen. "Iterative classification in relational data." In AAAI Workshop on Learning Statistical Models from Relational Data, pp. 13-20, 2000.

Jennifer Neville and David Jensen. Collective classification with relational dependency networks. In KDD Workshop on Multi-Relational Data Mining, pp. 77-91. Citeseer, 2003.

Caleb C Noble and Diane J Cook. "Graph-based anomaly detection." In KDD, pp. 631-636. ACM, 2003.

Myle Ott, Yejin Choi, Claire Cardie, and Jeffrey T Hancock. "Finding deceptive opinion spam by any stretch of the imagination." In ACL, pp. 309-319. ACL, 2011.

Bryan Perozzi and Leman Akoglu. "Scalable anomaly ranking of attributed neighborhoods." In SDM. SIAM, 2016.

Bryan Perozzi, Leman Akoglu, Patricia Iglesias Sanchez, and Emmanuel Muller. "Focused clustering and outlier detection in large attributed graphs." In KDD, pp. 1346-1355. ACM, 2014.

Prithviraj Sen, Galileo Namata, Mustafa Bilgic, Lise Getoor, Brian Galligher, and Tina Eliassi-Rad. "Collective classification in network data." AI magazine, 29(3):93, 2008.

Neil Shah, Alex Beutel, Brian Gallagher, and Christos Faloutsos. "Spotting suspicious link behavior with fbox: An adversarial perspective." In ICDM, pp. 959-964. IEEE, 2014.

Yizhou Sun, Jiawei Han, Xifeng Yan, Philip S Yu, and Tianyi Wu. "PathSim: Meta path-based top-K similarity search in heterogeneous information networks." In VLDB, 2011.

(56) References Cited

OTHER PUBLICATIONS

Yizhou Sun, Yintao Yu, and Jiawei Han. "Ranking-based clustering of heterogeneous information networks with star network schema." In KDD, pp. 797-806. ACM, 2009.
Baoning Wu, Vinay Goel, and Brian D Davison. "Propagating trust and distrust to demote web spam." MTW, 190, 2006.
Ward, Mark, "Warcraft Game Maker in Spying Row", BBC News, published Oct. 31, 2005, retrieved Aug. 14, 2015, 1 pg.

* cited by examiner

USER BEHAVIOR ANALYZER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present disclosure relates to a system and method for identifying abnormal client behavior based on communications between client devices and a server.

SUMMARY

According to various embodiments of the present disclosure, a method is provided for identifying abnormal client behavior with respect to communications between one or more servers and one or more client devices communicatively coupled to the one or more servers. A plurality of messages are received at a server from one or more client devices communicatively coupled to the server. The plurality of messages are grouped into subsets of messages using a learn module of the server. Each subset of messages is associated with a unique client identifier, and all messages within a subset are associated with the same unique client identifier. Each message within a subset of messages is identified as belonging to a defined type of message. Sequences of the defined types of messages within each of the subsets of messages are recorded using the learn module. Time intervals between the defined types of messages are measured using the learn module. The recorded sequences of defined types of messages and the measured time intervals between the defined types of messages are designated as constituting normal client behavior. A detect module of the server constructs a sequence of defined types of messages received from a client device and compares the constructed sequence of defined types of messages to a corresponding sequence of messages recorded by the learn module and designated as normal client behavior. Any differences between the constructed sequence and the corresponding recorded sequence are determined, and a constructed sequence that differs from the corresponding recorded sequence by more than a predetermined value or range of values is designated as abnormal client behavior.

Embodiments of the present disclosure can be made using computer hardware to implement the functionality, computer software comprising program code made up of instructions that, when executed, perform that functionality, or some combination of computer hardware and computer software. The computer software can be executed on special-purpose game hardware or a general-purpose programmable device or system. Various embodiments can also be embodied on computer-readable media that, when combined with a computer or computing device, implements the various embodiments. Such media might include CDROM, DVD, or networked storage such as an Internet-connected file server. A non-transitory computer readable medium can be provided and encoded with instructions adapted to be executed by a processor to perform method steps according to various embodiments of the present invention.

The following detailed description together with the accompanying drawings will provide a better understanding of the nature and advantages of the present invention.

DETAILED DESCRIPTION

Figure 1:
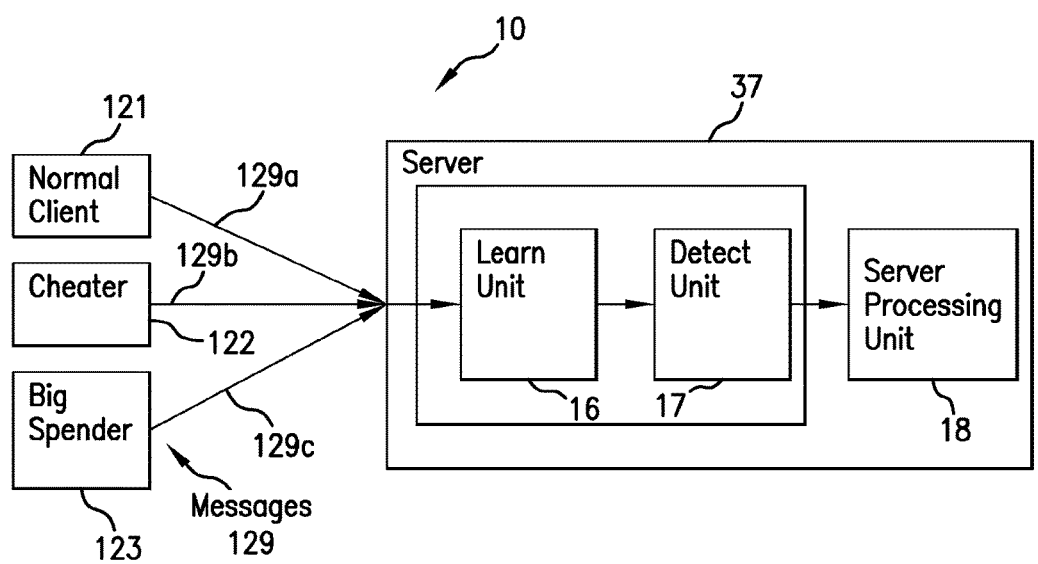
FIG. 1 illustrates a user behavior analyzer system according to an embodiment of the present invention.

Referring initially to an exemplary embodiment of the present disclosure shown in FIG. 1, a user behavior analyzer system 10 is shown to include client devices 121, 122, and 123 communicatively coupled to a server 37. The server 37 includes a learn unit or module 16, a detect unit or module 17, and a server processing unit or module 18. The client devices can be operated by, and are representative of users or players of a game or other interactive application communicatively coupled to a game server or other centrally located data and application management system.

The above-described client devices and server of the exemplary embodiment can include, for example, any suitable servers, workstations, PCs, laptop computers, PDAs, Internet appliances, handheld devices, cellular telephones, wireless devices, and other devices, capable of performing the processes of the exemplary embodiments. Multiple devices, servers, systems, and subsystems according to the exemplary embodiments can communicate with each other using any suitable protocol and can be implemented using one or more programmed computer systems or devices, such as the computer system 20 shown in FIG. 3.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices, servers, systems, and subsystems of the exemplary embodiments are for exemplary purposes, as many variations of the specific hardware used to implement the exemplary embodiments are possible, as will be appreciated by those skilled in the relevant art(s). For example, the functionality of one or more of the devices, servers, systems, and subsystems of the exemplary embodiments can be implemented via one or more programmed computer systems or devices, and the devices can include processors and memory maintained on a central server or system of servers, sometimes referred to as "on the cloud".

To implement such variations as well as other variations, a single mobile device or computer system can be programmed to perform the special purpose functions of one or more of the devices, servers, systems, and subsystems of the exemplary embodiments. On the other hand, two or more programmed computer systems or devices can be substituted for any one of the devices, servers, systems, and subsystems of the exemplary embodiments. Accordingly, principles and advantages of distributed processing, such as redundancy, shared information between users, replication, and the like, also can be implemented, as desired, to increase the robustness and performance of the devices, servers, systems, and subsystems of the exemplary embodiments.

The devices, servers, systems, and subsystems of the exemplary embodiments can store information relating to various processes described herein. This information can be stored in one or more memories, such as a hard disk, optical disk, magneto-optical disk, RAM, and the like, of the devices, servers, systems, and subsystems of the exemplary embodiments. One or more databases of the devices, servers, systems, and subsystems of the exemplary embodiments can store the information used to implement the exemplary embodiments. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices, servers, systems, and subsystems of the exemplary embodiments in one or more databases thereof.

All or a portion of the devices, servers, systems, and subsystems of the exemplary embodiments can be conveniently implemented using one or more general purpose computer systems, processing units or modules, microprocessors, digital signal processors, micro-controllers, and the like, programmed according to the teachings of the exemplary embodiments, as will be appreciated by those skilled in the computer and software arts. Appropriate software can be readily prepared by programmers of ordinary skill based on the teachings of the exemplary embodiments, as will be appreciated by those skilled in the software art. Further, the devices, servers, systems, and subsystems of the exemplary embodiments can be implemented on the World Wide Web. In addition, the devices, servers, systems, and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments can include software for controlling the devices, servers, systems, and subsystems of the exemplary embodiments, for driving the devices, servers, systems, and subsystems of the exemplary embodiments, for enabling the devices, servers, systems, and subsystems of the exemplary embodiments to interact with a human user, and the like. Such software can include, but is not limited to, device drivers, firmware, operating systems, development tools, applications software, and the like. Such computer readable media further can include the computer program product of an embodiment for performing all or a portion (if processing is distributed) of the processing performed in implementing the embodiments. Computer code devices of the exemplary embodiments can include any suitable interpretable or executable code mechanism, including but not limited to scripts, interpretable programs, dynamic link libraries (DLLs), Java classes and applets, complete executable programs, Common Object Request Broker Architecture (COREA) objects, and the like. Moreover, parts of the processing of the exemplary embodiments can be distributed for better performance, reliability, cost, and the like.

As stated above, the devices, servers, systems, and subsystems of the exemplary embodiments can include computer readable medium or memories for holding instructions programmed according to the teachings of the embodiments and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

Figure 3:
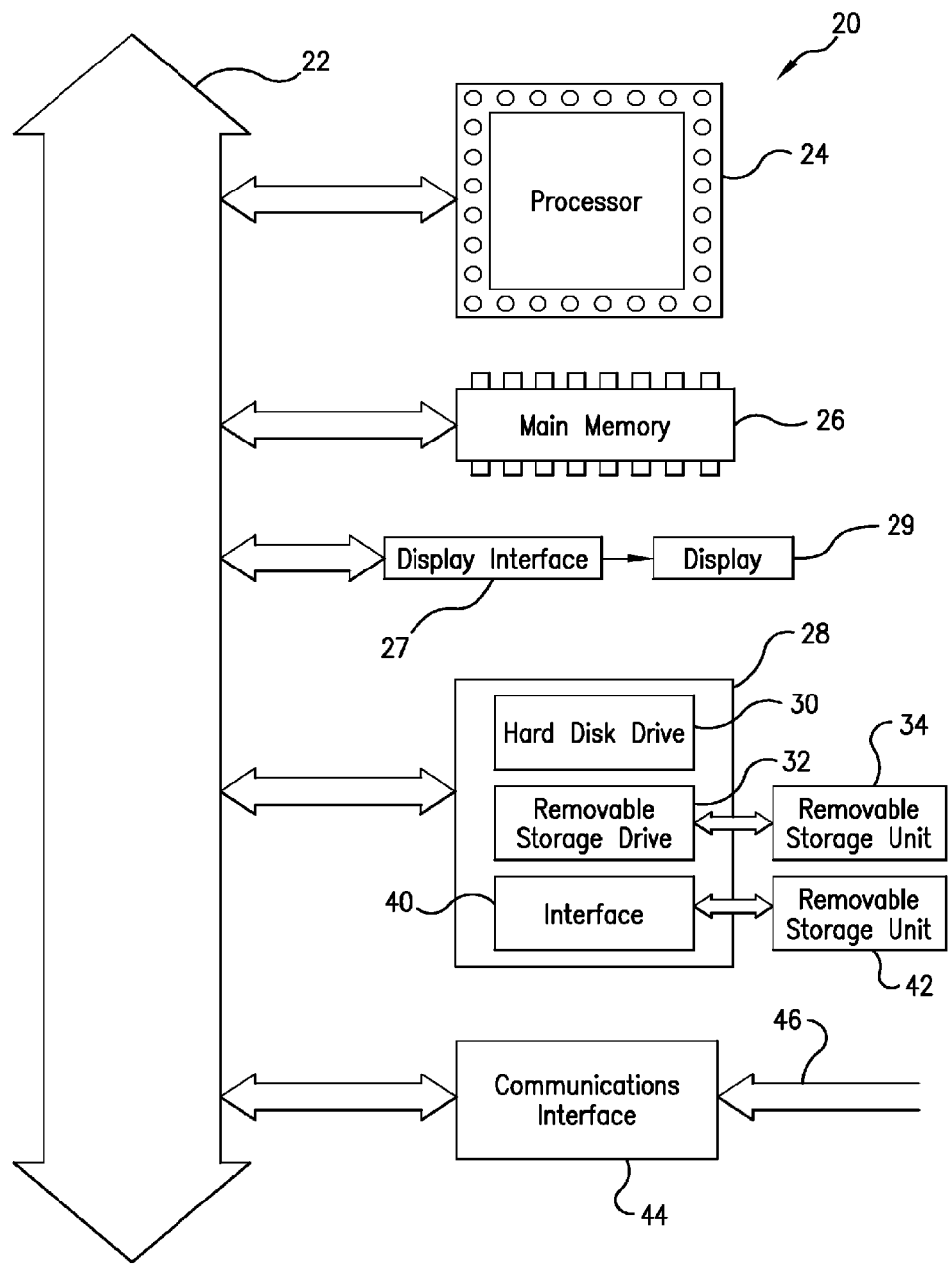
FIG. 3 illustrates exemplary computer architecture that could be used to implement the user behavior analyzer system according to one embodiment of the present invention.

Various embodiments may be implemented using hardware, software or a combination thereof and may be implemented in one or more computer systems or other processing systems. An example of a computer system 20 is shown in FIG. 3. The computer system 20 represents any single or multi-processor computer. In conjunction, single-threaded and multi-threaded applications can be used. Unified or distributed memory systems can be used. Computer system 20, or portions thereof, may be used to implement various embodiments.

In one example, the system of various embodiments can be implemented in a multi-platform (platform independent) programming language such as JAVA, programming language/structured query language (PL/SQL), hyper-text mark-up language (HTML), practical extraction report language (PERL), common translator interface/structured query language (CGI/SQL) or the like. Java-enabled and JavaScript-enabled browsers are used, such as, Netscape, HotJava, and Microsoft Explorer browsers. Active content Web pages can be used. Such active content Web pages can include Java applets or ActiveX controls, or any other active content technology developed now or in the future. Various embodiments, however, are not intended to be limited to Java, JavaScript, or their enabled browsers, developed now or in the future, as would be apparent to a person skilled in the relevant art(s) given this description.

In another example, the system of various embodiments, can be implemented using a high-level programming language (e.g., C or C++) and applications written for the Microsoft Windows 2000, Linux or Solaris environments. It will be apparent to persons skilled in the relevant art(s) how to implement the invention in alternative embodiments from the teachings herein.

Generally, the user behavior analyzer system according to various embodiments comprises software modules adapted to perform varying functionality during interaction of a user with a server via a communication device. Accordingly, the user behavior analyzer system can include a user interface for interacting with a user accessing the user behavior analyzer system and application logic for properly implementing the offered functionality of the user interface. One skilled in the art will recognize that the user behavior analyzer system can embody a variety of interactive systems. Such interactive systems include, but are not limited to, access to a central game server through web sites and applications, game consoles, mobile computing devices such as computers, smart phones, tablets and other mobile computing devices, interactive voice response (IVR) systems—including speech recognition, and other similar systems. The user behavior analyzer system may also be a combination of multiple interactive sub-systems such as those mentioned above, thereby interacting with the user via multiple channels—each with their own system made up of a user interface and application logic. In such a case, the learn module 16 and detect module 17 of the server 37 in the exemplary and illustrative embodiment of FIG. 1 would be collecting and analyzing data received through multiple channels.

The user behavior analyzer system 10 is adapted and configured to analyze and/or monitor user activity in the user behavior analyzer system 10. The user behavior analyzer system 10, therefore, comprises software modules and hardware for performing the functionality and operational characteristics described herein. Upon the analyzing of user behavior or activity on the user behavior analyzer system 10, the user behavior analyzer system 10 can provide recommendations or actions based on client communications. The recommendations or actions can include, but are not limited to, recommending directing additional advertisements, prizes, incentives, etc. to a client determined to be spending an abnormal amount of money in the system, or restricting access to the game server for a client determined to be cheating or otherwise deviating from protocols or desired behaviors.

In operation, the user behavior analyzer system 10 can analyze interaction of one or more clients or users with the user behavior analyzer system in the context of the user behavior analyzer system's structure, and even report on the behavior of the users and how the structure of the user behavior analyzer system, or design of the games or other interactive applications being participated in by the users, can be improved to better facilitate the goals of the users and the goals of the user behavior analyzer system's designers. Through a generic approach to modeling the user behavior analyzer system 10, described more fully below, and modeling user behavior of the users communicating with the user behavior analyzer system 10, the system 10 can be applied in many different system domains. Additionally, the system can be configured to analyze user behavior across multiple domains through several related systems. For example, the system 10 can be designed and configured to follow a user, based on persistent user data stored in a memory, for example, from an interactive web-based gaming system where the user is playing at a computer terminal, to a game console-based gaming system where the user is playing on a game console, to a mobile application where the user is playing from a smart phone or other portable device, to analyzing user behavior across different channels. While several example domains may be discussed within the description, one skilled in the art will recognize that embodiments of the present invention can be adapted for use with a variety of domains.

Clients or users 121, 122, 123 of many interactive systems are human, including those users described above in the provided examples. Those skilled in the art will recognize, however, that the user behavior analyzer system 10 could be used to analyze system behavior when the user of the system is not human. For example, the user behavior analyzer system 10 might be a network management system where the users are various network devices.

The user behavior analyzer system 10 can be designed and implemented with software modules using an object-oriented paradigm and, therefore, components described herein can map to interfaces, classes, and objects in the implementation language. The user behavior analyzer system 10 can allow an analyst to model the user behavior analyzer system, provide event, activity or behavior trace logs for analysis, create the data that fuses the structural model and behavior, and define, execute and view reports based on the data.

The user behavior analyzer system can also comprise more than one subsystem, where the subsystems can be in communication with each other directly or indirectly. Additionally, the user behavior analyzer system 10 can communicate with each of the clients or users through a network environment. One skilled in the art will recognize that the network over which the clients and the server communicate can contain the infrastructure and facilities appropriate to connect a group of two or more communication devices.

The client devices and server can be configured in multiple network topologies including, but not limited to, peer-to-peer or client/server architectures. In an exemplary embodiment such as shown in FIG. 1, the network allowing for the communication of messages 129a, 129b, and 129c from clients 121, 122, and 123, respectively, to server 37 may additionally be classified by the geographical location of the server 37 and the client devices, and the types thereof.

In accordance with the above description of various exemplary embodiments of methods and systems according to the present invention for the interactive communication between client devices and a game server 37 or other central processing system, examples of foreseeable problems or challenges that the system is designed to deal with include that some clients 122 may attempt to cheat the game, and some clients 123 are big spenders, while most clients 121 behave as expected. In one exemplary embodiment, a client 121, 122, 123 can send messages 129 to a server 37. The messages can be processed by a learn unit or module 16 and a detect unit or module 17 before being sent to a server processing unit 18.

Detection of abnormal client behavior using an anomaly-based detection approach, according to various exemplary embodiments of the present disclosure, complements a signature-based approach by offering a means to detect abnormal behaviors whose signatures are not yet known or that exhibit modified behavior (e.g., intentionally stealthy behavior or variants of existing behavior in new environments). The user behavior analyzer system 10 according to various embodiments can be configured to apply to any entity whose relevant state or behavior is under observation. For example, various embodiments of the system can be used to monitor communications from a host or server, or a given network application, or one or more users or clients. The user behavior analyzer system 10 can be implemented in accordance with a number of operations. First, measures (or observations) of normalcy are defined for a given set of communications using the learn unit or module 16. Next, a characterization of the normalcy of the communications is created. This characterization can be in a form of deviations from an expected pattern or sequence of communications, expected sequence of types of communications, frequency of particular sequences of messages, timing of sequences of messages, timing between certain types of messages in the communications, etc. This may require a learning or training process, which can be performed by the learn unit or module 16 shown in FIG. 1.

Next, an algorithm for building a run-time characterization of the communications can be defined. Measures of discrepancy between the normalcy and the run-time characterization can then be defined. Once again, this step may require learning or training. The measure of discrepancy and the way the actual measurement is obtained can introduce inherent differences that are accounted for in a threshold determination step. Finally, anomaly thresholds for generating appropriate alarms, notifications, or actions can be defined. This approach can be implemented using multiple techniques, including statistical, neural networks, and other forms of learning mechanisms.

The user behavior analyzer system 10 can create a characterization of normal client communications behavior in order to achieve accurate anomaly detection (i.e., with low false positive and low false negative rates). Since entities, such as clients or users, network applications, servers, etc. can have different behaviors, a new characterization can be created for each new application or application program interface to be monitored through anomaly detection. In one exemplary embodiment of the disclosure, the user behavior analyzer system 10 can operate in two phases. In a learning or training phase, the targeted communications could be in a state for which a relatively high level of confidence in the normalcy of the communications can be determined. Depending on the resource availability, the learning or training phase could be conducted either online or offline. In the online case, training data comes directly from the realtime communications captured while the system is in operation. In the offline case, training data comes from historical or previously captured and recorded sequences of messages, which are stored in a file. The length of the learning or training phase can depend on the inherent variability of the types and frequencies of communications received for particular applications. The learning or training phase can stop automatically when certain stability criteria have been met. However, the ability to turn on the learning or training mode at any time could be provided and programmed into the learn unit or module 16.

After conclusion of the learning or training phase, the detect unit or module 17 can operate in a detection phase. The detection phase can produce anomaly scores for the observed communications based on the characteristic similarity between the observed and normal profiles. A higher score could indicate a higher degree of deviation from the normalcy and thus a stronger indication of abnormal client behavior.

While the learning or training phase can account for the differences in characteristics and patterns of communications received from different applications, there could also be variability in attributes including, but not limited to, time (e.g., the time of day) that may be significant enough to require new profiles for effective detection of abnormal client behavior. The learn module can be designed to support various means for adaptation. As non-limiting examples of these means for adaptation, an interface could be provided for human analysts, to allow the input of final alert assessment results and to keep track of the false alarm rate changes. In the case where false positives of apparent abnormal client behavior increases and stays at a higher level, this can be considered a good indication of a system/environment change that can be accounted for by re-training the learn unit. In the case where the rate of false positives of apparent abnormal client behavior fluctuates periodically with time, it can be considered to be a good indication that a new set of profiles with a different periodicity is required.

Another adaptive technique that can be implemented by the learn unit or module 16 is to support multiple profiles that can be dynamically updated with time, or equivalently one profile that adapts continuously but more quickly. To better support creation of new profiles dynamically, the data received by the learn unit that is determined to be characteristic of anomalous sequences of messages could be kept in a log file until it is determined at a later time that they were normal, or they could be moved to long-term archive. At that time, these logged sequences could be used to create new profiles or to re-train existing profiles.

The learn unit or module 16 can be configured to learn about aggregate average client behavior. A state machine can be used to model the behavior of a client in the types, sequence, timing, and frequency of communications or messages between the client and a central server or other processing device. As shown in an exemplary embodiment illustrated in FIG. 2, a state machine 140 can be presented as a graph consisting of nodes 52, 54, 56, and 58 connected by directed edges 62, 64, 66, 68, and 70. The nodes 52, 54, 56, and 58 can be representative of particular states, where a state is a particular and distinct action or behavior. A directed edge 62 connecting node or state 52 to node or state 54 represents the statement that an action B of the node 54 is permitted to follow from an action A of the node 52. The absence of an edge going from the action B of node 54 to the action C of node 56 is representative of the statement that action C does not directly follow the action B.

Figure 2:
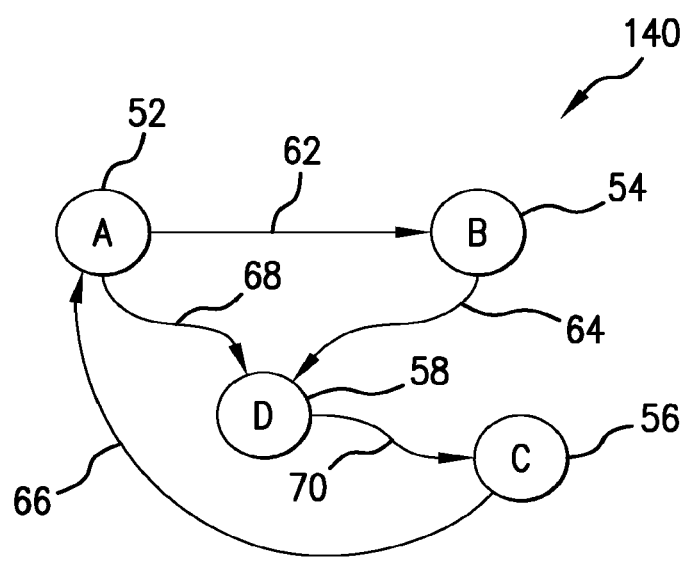
FIG. 2 illustrates a state machine implemented by the user behavior analyzer system of FIG. 1 according to an embodiment of the present invention.

The user behavior analyzer system 10 can be configured or adapted to model the communications between clients and server into one or more state machines. A client or user provides inputs and receives outputs through a user interface. The communications a user sends to the server, such as messages 129a, 129b, and 129c in FIG. 1, can be represented by the user behavior analyzer system learn unit 16 as a sequence of states and transitions between those states (also referred to herein as a "state machine 140"). As defined by the user behavior analyzer system learn unit 16, state machine 140 for the client communications may be made up of states for each type of communication (e.g., log-in message, buy item message, play message, sell item message, auction message, end match message, etc.) provided by the user interface, with transitions between inputs made by a user at the user interface indicating possible changes to another unit of interaction based on user input and the context or state of the user behavior analyzer system 10. For example, and not by way of limitation, the user behavior analyzer system 10 may be an internet gaming site that provides access to interactive video games. In an exemplary embodiment, such as shown in FIG. 2, a state machine 140 for a gaming application can be created with a state or node for each message sent by a user to the game server over the internet. State transitions or edges, such as edge 62 between states 52 and 54, edge 64 between states 54 and 58, edge 66 between states 56 and 52, edge 68 between states 52 and 58, and edge 70 between states 58 and 56 in FIG. 2, can represent the normal transitions and sequences of particular types of messages communicated by a user during participation in an interactive video game.

The learn unit 16 can create state machines that evolve and change over time to model changes in what is considered normal client behavior during interactions with the gaming server 37.

As shown in the exemplary embodiment of FIG. 1, a message 129a communicated between a client 121 and a server 37 can comprise a type of message and an associated parameter or parameters. The learn unit or module 16 shown in FIG. 1 can receive a raw stream of messages 129a, 129b, and 129c sent by multiple clients 121, 122, and 123. As further illustrated in the flow chart of FIG. 4, after receiving messages (step 402) at the server 37, the learn unit 16 can separate and group (step 404) the raw stream of messages into multiple, separated client streams of messages. The separation or grouping (step 404) of the client streams of messages into subsets of messages can be achieved in various ways, including providing each message 129 with a unique client identifier as a parameter, and associating each subset of messages with a unique client identifier, with all messages within a subset being associated with the same unique client identifier (step 406). In one exemplary embodiment, and as shown in step 408 of FIG. 4, the learn unit 16 can also identify each message within a subset of messages as belonging to a defined type of message. Each type of message can be associated with a particular state used in the construction of a state machine such as state machine 140 referenced above. Since each message after an initial message sent by a client to the server follows a previous message, the learn unit 16 can record the sequences of defined types of messages and use the order of message types received to construct a state machine, as shown in step 410 of FIG. 4.

If a message of type B, such as the action or behavior associated with node 54 in FIG. 2 follows a message of type A, such as the action or behavior associated with node 52 in FIG. 2, the learn unit 16 can construct the states or nodes A and B with an edge 62 connecting A to B as shown in FIG. 2. By sampling a sufficiently large stream of messages 129 being sent from various clients 121, 122, and 123 to a server such as the server 37 shown in FIG. 2, the learn unit 16 can construct a reasonably complete state machine. The larger the stream sample, the more accurate the resultant state machine. The learn unit 16 can record the total number of states and state changes, such as represented by nodes 52, 54, 56, and 58 in FIG. 2, and the learn unit 16 may remove a state change edge, such as one or more of the edges 62, 64, 66, 68, and 70, if the total number of states and state changes is below some preset value or ratio.

The order in which certain message types in a client message stream are received by the learn unit 16 is a consequence of client behavior. Therefore, the learn unit 16 can sample message streams from "normal" clients, and the resultant state machine constructed by the learn unit 16 can be representative of the normal behavior patterns of clients.

Starting with a sample stream of messages, the learn unit records the sequences of subsequent state occurrences based on the sequences of types of messages sent from clients to the server. The length of a particular sequence recorded by the learn unit can range from a minimum value to a maximum value, with the minimum and maximum values being provided by an operator or being preset values. Thus, if a stream of messages contains the message types ACD-FABADC, and the minimum and maximum sequence lengths are set to 1 and 3 respectively, then the sequences recorded by the learn unit are: A, AC, ACD, AB, ABA, AD, ADC. Each entry in a sequence is a state. For all messages that the learn unit uses to build a sequence entry, the learn unit can use these messages to compute for each message parameter the average expectation and deviation value. Message parameters can include data such as the type of item purchased by the client, the number of items, the amount spent, etc. The learn unit may use a variety of statistical techniques to determine the average expectation, e.g. sample mean, weighted mean, median, etc. Similarly, the deviation can be stated with the standard deviation from the mean and the range bracketed by a minimum and maximum value. The learn unit associates all of these values to the corresponding entry in a sequence. As shown in step 414 of FIG. 4, the learn unit 16 can then designate particular sequences of the defined types of recorded messages as constituting "normal" client behavior.

Figure 4:
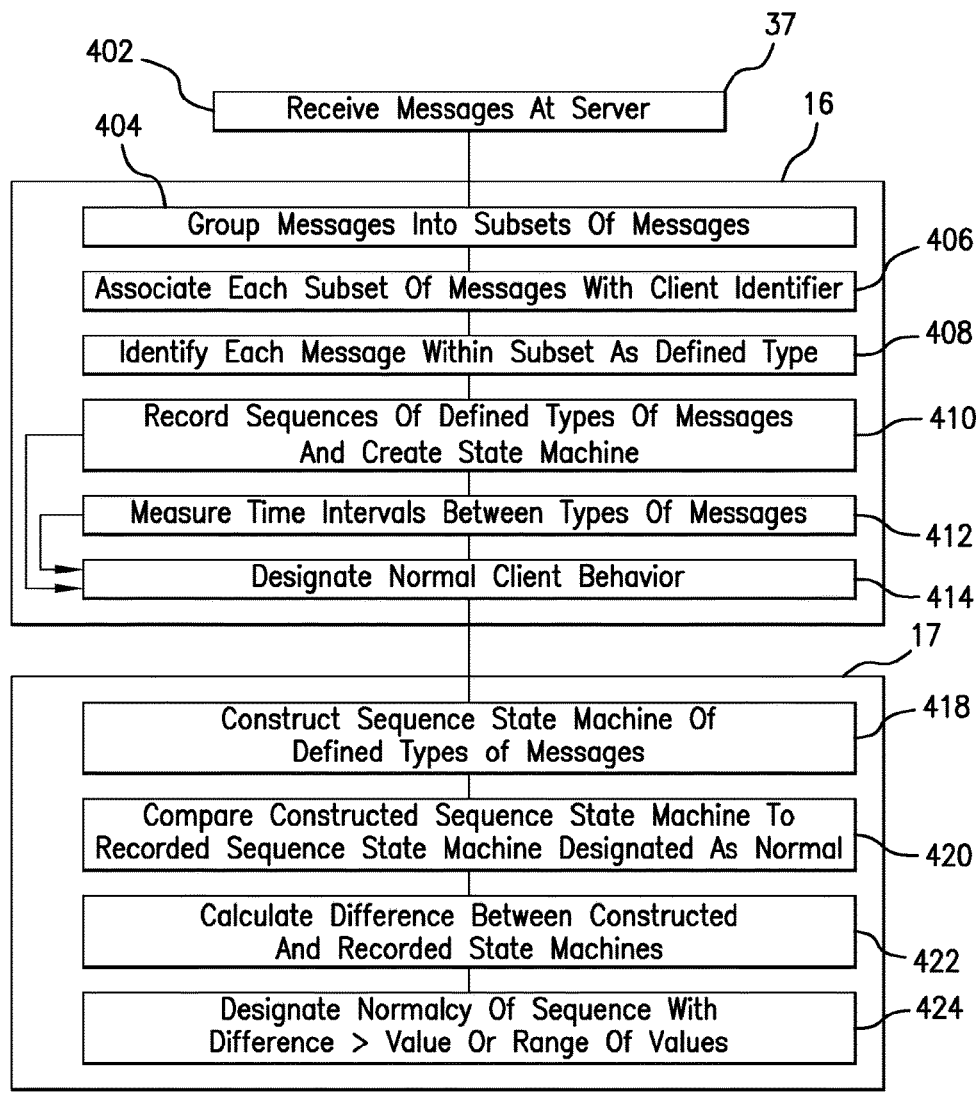
FIG. 4 illustrates a flow chart of method steps according to one embodiment of the present invention.

For the messages in a sample stream corresponding to two subsequent entries in a sequence of messages, the learn unit can record the time intervals between the two messages corresponding to the two subsequent entries, as shown in step 412 of FIG. 4. Using time-frequency techniques, such as the Fourier Transform, the learn unit can determine the frequency domain information from the time domain information and associate the frequency domain information to the corresponding sequence entry. The time domain or frequency domain information can then be used in the determination of whether to consider a particular sample stream of messages as "normal" client behavior, as shown in step 414 of FIG. 4.

Through the above techniques, the learn unit learns about the expected average frequency of a particular behavior pattern from the sample stream of messages. The learn unit can also apply the same time-frequency techniques to the sequence intervals.

In addition to constructing the sequences from a sample message stream, the learn unit can be configured to accept sequences of messages through other means such as a human operator.

As shown in step 418 of FIG. 4, the detect unit 17 can build a state machine and sequences with associated statistical and frequency information for each client or user, using the actual user message stream similar to the learn unit. As shown in step 420 of FIG. 4, for each sequence that the detect unit constructs in real time from the message stream, the detect unit 17 finds the corresponding historical sequence from the learn unit 16 and compares the constructed sequence or state machine created by the detect unit 17 to the recorded sequence or state machine created by the learn unit 16. As shown in step 422 of FIG. 4, the detect unit 17 then calculates the difference between the historical sequence information and the instant, constructed sequence information. In step 424 of FIG. 4, if the difference between the historical, recorded sequence of defined types of messages and the sequence of defined types of messages constructed by the detect unit 17, falls inside a preset window, the detect unit considers the behavior associated with the sequence as normal, otherwise, if the difference is greater than a designated value or range of values, the detect unit 17 can designate the behavior to be abnormal. If desired, the detect unit 17 can forward abnormal behaviors and the associated client information to an analysis unit. The analysis unit can be human operated or can take automated actions.

Exemplary Computer Architecture

In various exemplary embodiments of the present disclosure, the user behavior analyzer system can comprise a computer system 20, such as illustrated in FIG. 3, with the computer system including one or more processors, such as processor 24. One or more processors 24 can comprise the Learn Unit 16 and Detect Unit 17 described above, and can execute software implementing the routines described above. Each processor 24 can be connected to a communication infrastructure 22 (e.g., a communications bus, crossbar, or network). Various software embodiments are described in terms of this exemplary computer system. After reading this description, it will become apparent to a person skilled in the relevant art how to implement the invention using other computer systems and/or computer architectures.

Computer system 20 can include a display interface 27 that forwards graphics, text, and other data from the communication infrastructure 22 (or from a frame buffer not shown) for display on the display unit 29.

Computer system 20 can also include a main memory 26, preferably random access memory (RAM), and can also include a secondary memory 28. The secondary memory 28 can include, for example, a hard disk drive 30 and/or a removable storage drive 32, representing a floppy disk drive, a magnetic tape drive, an optical disk drive, etc. The removable storage drive 32 can read from and/or write to a removable storage unit 34 in a well known manner. Removable storage unit 34 represents a floppy disk, magnetic tape, optical disk, etc., which is read by and written to by removable storage drive 32. As will be appreciated, the removable storage unit 34 can include a computer usable storage medium having stored therein computer software and/or data.

In alternative embodiments, secondary memory 28 can include other similar means for allowing computer programs or other instructions to be loaded into computer system 20. Such means can include, for example, a removable storage unit 42 and an interface 40. Examples can include a program cartridge and cartridge interface (such as that found in video game console devices), a removable memory chip (such as an EPROM, or PROM) and associated socket, and other removable storage units 42 and interfaces 40 which allow software and data to be transferred from the removable storage unit 42 to computer system 20.

Computer system 20 can also include a communications interface 44. Communications interface 44 allows software and data to be transferred between computer system 20 and external devices such as the client devices 121, 122, and 123 in FIG. 1, via communications path 46. Examples of communications interface 44 can include a modem, a network interface (such as Ethernet card), a communications port, interfaces described above, etc. Software and data transferred via communications interface 44 are in the form of signals which can be electronic, electromagnetic, optical or other signals capable of being received by communications interface 44, via communications path 46. Note that communications interface 44 can provide a means by which computer system 20 can interface to a network such as the Internet.

Various embodiments can be implemented using software running (that is, executing) in an environment similar to that described above. The term "computer program product" is used to generally refer to a removable storage unit such as removable storage unit 34 in FIG. 3, a hard disk installed in a hard disk drive such as hard disk drive 30 in FIG. 3, or a carrier wave carrying software over a communication path such as communication path 46 in FIG. 3 (wireless link or cable) to a communication interface such as communication interface 44 in FIG. 3. A computer useable medium can include magnetic media, optical media, or other recordable media, or media that transmits a carrier wave or other signal. These computer program products can provide means for providing software to computer system 20.

Computer programs (also called computer control logic) can be stored in main memory 26 and/or secondary memory 28. Computer programs can also be received via communications interface 44. Such computer programs, when executed, enable the computer system 20 to perform the features of various embodiments as discussed herein. In particular, the computer programs, when executed, enable the processor 24 to perform features of various embodiments. Accordingly, such computer programs represent controllers of the computer system 20.

Various embodiments can be implemented as control logic in software, firmware, hardware or any combination thereof. In an embodiment implemented using software, the software may be stored in a computer program product and loaded into computer system 20 using removable storage drive 32, hard disk drive 30, or interface 40. Alternatively, the computer program product may be downloaded to computer system 20 over communications path 46. The control logic (software), when executed by the one or more processors 24, causes the processor(s) 24 to perform functions of the various embodiments as described herein.

In another embodiment, features are implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

While the various disclosed features have been described in connection with a number of exemplary embodiments, and implementations, various embodiments are not so limited, but rather cover various modifications, and equivalent arrangements, which fall within the purview of the appended claims.

What is claimed is:

1. An anomaly detection computing system, the system comprising:

an account data store configured to store at least one state machine graph, wherein individual state machine graphs are generated based, at least in part, on recorded sequences of electronic messages received from client computing devices during participation in an interactive video game application, the state machine graph defining a sequence of states and transitions between each state, wherein each state is representative of a type of electronic message;

a server computing system including one or more processors and in electronic communication with a data store, the server computing system configured to execute the interactive video game application and communicatively couple with a plurality of client computing devices, the server computing system comprises computer readable instructions that when executed configure the server computing system to:

receive a plurality of electronic messages from a plurality of client computing devices communicatively coupled to the server during runtime execution of the interactive video game application, wherein each electronic message of the plurality of electronic messages is a defined type of message communicated by a client computing device during participation in the interactive video game application;

group the plurality of electronic messages into one or more sets of electronic messages;

construct a first sequence of electronic messages for a first set of electronic messages of the one or more sets of electronic messages, wherein the first set of electronic messages are received from a first client computing device;

compare the first sequence of electronic messages to a sequence of states of a state machine graph of the one or more state machine graphs, wherein each state machine graph is configured to model a different type of client behavior within the interactive video game application;

generate an anomaly score based at least in part on the differences between characteristics of the first sequence and characteristics of the defined sequence of the state machine graph; and in response to determination that the anomaly score exceeds an anomaly detection threshold, generate an output designating the constructed sequence as abnormal relative to the defined client behavior.

2. The system of claim 1 further comprising computer readable instructions that when executed cause the server computing system to restrict access of the first client computing to the interactive computing application based on the determination that the anomaly score exceeds an anomaly detection threshold.

3. The system of claim 1 further comprising computer readable instructions that when executed cause the server computing system to measure time intervals between the messages of the first sequence of messages.

4. The system of claim 3 further comprising computer readable instructions that when executed cause the server computing system to transform the measured time intervals using Fourier analysis to calculate an average expected frequency of each message of the first sequence.

5. The system of claim 1, wherein two or more of the states of the state machine graph are representative of the same type of message.

6. The system of claim 1, wherein each message comprises data for a client interaction associated with the message.

7. The system of claim 1 further comprising computer readable instructions that when executed cause the server computing system to assign a specific unique identifier to each message associated with a client computing device.

8. The system of claim 1, wherein the defined client behavior is normal client behavior.

9. The system of claim 1, wherein the interactive computing application is an interactive video game application and the messages are communicated by the client computing devices during participation in the interactive video game application.

10. The system of claim 1, wherein each defined type of message corresponds to a unique client behavior.

11. A method for identifying abnormal client behavior with respect to communications between one or more servers and one or more client devices communicatively coupled to the one or more servers, the method comprising:

receiving a plurality of electronic messages from a plurality of client computing devices communicatively coupled to the server during runtime execution of an interactive video game application, wherein each electronic message of the plurality of electronic messages is a defined type of message communicated by a client computing device during participation in the interactive video game application;

grouping the plurality of electronic messages into one or more sets of electronic messages;

constructing a first sequence of electronic messages for a first set of electronic messages of the one or more sets of electronic messages, wherein the first set of electronic messages are received from a first client computing device;

comparing the first sequence of electronic messages to a state machine graph, the state machine graph defining a sequence of states and transitions between each state, wherein each state is representative of a type of message, wherein the state machine graph is configured to model a defined type of client behavior within the interactive video game application;

generating an anomaly score based at least in part on the differences between characteristics of the first sequence and characteristics of the defined sequence of the state machine graph; and in response to determination that the anomaly score exceeds an anomaly detection threshold, generating an output designating the constructed sequence as abnormal relative to the defined client behavior.

12. The method of claim 11 further comprising restricting access of the first client computing to the interactive computing application based on the determination that the anomaly score exceeds an anomaly detection threshold.

13. The method of claim 11 further comprising measuring time intervals between the messages of the first sequence of messages.

14. The method of claim 13 further comprising transforming the measured time intervals using Fourier analysis to calculate an average expected frequency of each message of the first sequence.

15. The method of claim 11, wherein the interactive computing application is an interactive video game application and the messages are communicated by the client computing devices during participation in the interactive video game application.

16. The method of claim 11 further comprising computer readable instructions that when executed cause the server computing system to assign a specific unique identifier to each message associated with a client computing device.

17. A non-transitory computer readable medium comprising computer-executable instructions for anomaly detection that, when executed by a server computing system, causes the server computing system to:

receive a plurality of electronic messages from a plurality of client computing devices communicatively coupled to the server computing system during runtime execution of an interactive video game application, wherein each electronic message of the plurality of electronic messages is a defined type of message communicated by a client computing device during participation in the interactive video game application;

group the plurality of electronic messages into one or more sets of electronic messages;

construct a first sequence of electronic messages for a first set of electronic messages of the one or more sets of electronic messages, wherein the first set of electronic messages are received from a first client computing device;

compare the first sequence of electronic messages to a state machine graph, the state machine graph defining a sequence of states and transitions between each state, wherein each state is representative of a type of message, wherein the state machine graph is configured to model a defined type of client behavior within the interactive video game application;

generate an anomaly score based at least in part on the differences between characteristics of the first sequence and characteristics of the defined sequence of the state machine graph; and in response to determination that the anomaly score exceeds an anomaly detection threshold, generate an output designating the constructed sequence as abnormal relative to the defined client behavior.

18. The computer readable medium of claim 17 further comprising computer readable instructions that when executed cause the server computing system to restrict access of the first client computing to the interactive computing application based on the determination that the anomaly score exceeds an anomaly detection threshold.

19. The computer readable medium of claim 17 further comprising computer readable instructions that when executed cause the server computing system to measure time intervals between the messages of the first sequence of messages.

20. The computer readable medium of claim 17, wherein the interactive computing application is an interactive video game application and the messages are communicated by the client computing devices during participation in the interactive video game application.

* * * * *